United States Patent
Huque et al.

(10) Patent No.: US 8,150,029 B2
(45) Date of Patent: Apr. 3, 2012

(54) DETECTION OF A DISTURBANCE IN A CALCULATION PERFORMED BY AN INTEGRATED CIRCUIT

(75) Inventors: Thierry Huque, Moxhe (BE); Jean-Louis Modave, Ottignies (BE)

(73) Assignee: Proton World International N.V., Zaventem (BE)

( * ) Notice: Subject to any disclaimer, the term of this patent is extended or adjusted under 35 U.S.C. 154(b) by 1035 days.

(21) Appl. No.: 11/647,114

(22) Filed: Dec. 28, 2006

(65) Prior Publication Data
US 2008/0021941 A1   Jan. 24, 2008

(30) Foreign Application Priority Data
Dec. 29, 2005  (FR) .................................. 05 54134

(51) Int. Cl.
*G06F 21/00* (2006.01)
(52) U.S. Cl. .............. 380/1; 380/28; 708/491; 708/466; 713/174
(58) Field of Classification Search ................ 380/1, 28; 708/491, 466; 713/174
See application file for complete search history.

(56) References Cited

U.S. PATENT DOCUMENTS

| | | | |
|---|---|---|---|
| 6,246,970 B1 * | 6/2001 | Silverbrook et al. | 702/117 |
| 6,298,135 B1 * | 10/2001 | Messerges et al. | 380/1 |
| 7,000,111 B1 * | 2/2006 | Dent et al. | 713/174 |
| 2004/0215685 A1 | 10/2004 | Seifert et al. | |
| 2004/0267859 A1 * | 12/2004 | Fischer et al. | 708/606 |
| 2005/0243998 A1 * | 11/2005 | Plessier | 380/28 |
| 2006/0133603 A1 | 6/2006 | Joye et al. | |
| 2007/0156797 A1 | 7/2007 | Modave et al. | |
| 2007/0162534 A1 * | 7/2007 | Liardet et al. | 708/446 |

FOREIGN PATENT DOCUMENTS

| | | |
|---|---|---|
| WO | WO 99/67909 A2 | 12/1999 |
| WO | WO 02/099624 A1 | 12/2002 |

OTHER PUBLICATIONS

Merriam-Webster, operand definition, 2011, Merriam-Webster.*
Wikipedia, operand definition, 2011 Wikipedia.*
French Search Report from French Patent Application 05/54134, filed Dec. 29, 2005.
French Search Report from French Patent Application 05/54133, filed Dec. 29, 2005.

* cited by examiner

*Primary Examiner* — Edan Orgad
*Assistant Examiner* — Brian Olion
(74) *Attorney, Agent, or Firm* — Wolf, Greenfield & Sacks, P.C.

(57) ABSTRACT

A method for detecting a disturbance of a calculation, by an electronic circuit, of a result of an integral number of applications of an internal composition law on elements of an abelian group, by successive iterations of different steps according to the even or odd character of a current coefficient of a polynomial representation of said integral number, the degree of which determines the number of iterations, each iteration including: in case of an odd current coefficient, updating at least one first variable intended to contain the result at the end of the calculation; and in case of an even current coefficient, of updating a second variable and a comparison of this second variable with an expected value.

15 Claims, 5 Drawing Sheets

DETECTION OF A DISTURBANCE IN A CALCULATION PERFORMED BY AN INTEGRATED CIRCUIT

BACKGROUND OF THE INVENTION

1. Field of the Invention

The present invention generally relates to electronic circuits and, more specifically, to integrated circuits comprising calculation elements (software and/or hardware) implementing algorithms performing several identical operations on a same element of a group in the mathematical meaning of the word. "Operation" is used to designate any law of composition of two elements in the group such that the result is an element in the group. The term "operation" and the expression "internal (composition) law" will be used interchangeably hereafter.

An example of application of the present invention relates to exponentiations especially performed in cryptographic calculations, for example of a so-called RSA algorithm which is a public key algorithm based on a modular exponentiation calculation.

Another example of application of the present invention relates to operations performed on elliptic curves in cryptographic calculations, for example, of a so-called Diffie-Hellman algorithm which is a protocol for generating shared keys from an exchange of public keys.

The present invention more specifically relates to the protection of an iterative calculation against attacks by disturbance of the operation of the electronic circuit executing the calculation. Such attacks for example aim at discovering quantities intended to remain secret. The present invention more specifically relates to so-called fault-injection attacks.

An example of application of the present invention relates to smart cards and the like.

2. Discussion of the Related Art

FIG. 1 very schematically shows a smart card 1 of the type to which the present invention applies as an example. Such a card is most often formed of a plastic support on or in which is placed an integrated circuit chip 10 associated with contacts 5 of communication with a terminal (not shown) and/or with radio-frequency transmit/receive elements, not shown, for a contactless communication.

Another example of application of the present invention relates to microcomputers and more generally electronic boards (for example, a personal computer motherboard) comprising an integrated circuit performing calculations on a group, for example, for data transmission.

FIG. 2 very schematically shows, in the form of blocks, a conventional example of electronic circuit 10, for example, of a smart card, to which the present invention more specifically applies. In this example, it is a microcontroller comprising a central processing unit 11 (CPU) capable of executing programs most often contained in a ROM 12 with which unit 11 communicates by means of one or several buses 13. Bus(es) 13 convey signals between the different circuit elements and especially between central processing unit 11 and one or several RAMs 14 intended to contain data being processed, and an interface 15 (I/O) for communicating with or without contact with the outside of circuit 10. In circuits to which the present invention applies, a ciphering or cryptography function 16 (CRYPTO) is most often implemented in hardware fashion in microcontroller 10 and executes at least one calculation, for example, of exponentiation. The microcontroller may also comprise a rewritable non-volatile memory area 17 (NVM) (for example, of EEPROM type or the like) and other functions (block 18, FCT) according to the application, for example, cyclic redundancy check (CRC) functions, functions of generation of digital quantities for a DES-type algorithm, etc.

The present invention also applies to simpler integrated circuits only having a cryptographic calculation unit and a memory area for storing at least one or several quantities intended to remain secret and defining the number of iterations of the operation.

FIG. 3 very schematically illustrates in the form of blocks a conventional example of an RSA algorithm exploiting a modular exponentiation calculation. Such an algorithm is described, for example, in the "Handbook of Applied Cryptography" by A. Menezes, P. Van Oorschot, and S. Vanstone, published by CRC Press in 1997, and in RSA Cryptography Standard V2.1 (RSA Labs, Jun. 14, 2002), which is incorporated hereby by reference.

A message M to be ciphered is sent to a ciphering cell 161 (for example, a dedicated portion of an integrated circuit) which also receives or contains an exponent e and a modulo n to be used in the calculation and which define the public key of the RSA algorithm. Block 161 executes calculation $M^e$ mod n and provides ciphered message M'.

On the deciphering side, a modular exponentiation cell 162 receives message M', as well as modulo n (public in the RSA case) and an exponent d here defining an element of the private key of the message receiver. The performed calculation is identical to that of the ciphering. Cell 162 executes operation $M'^d$ mod n to provide message M plain. The possible relations that numbers e, d, and n should respect for the implementation of the RSA algorithm are of no importance for the discussion of the present invention. In practice, the same circuit may comprise a single cell 161 or 162 loaded with different parameters according to whether it ciphers or deciphers.

Due to the size of the handled numbers, the exponentiation is calculated by a so-called square-and-multiply technique which exploits the binary representation of the exponent (e or d) to break up the calculation into a succession of squarings and multiplications by a preceding intermediary result.

FIG. 4 is a flowchart illustrating an exponentiation calculation by a conventional square-and-multiply technique. The calculation, shown in the form of a flowchart in FIG. 4, is in practice generally performed by a hardware cell (in wired logic) but may also be implemented by software means.

A first step (block 21, R=1; T=M; e'=e) comprises initializing a result variable R to one, a temporary variable T as containing message M, and an exponent variable e' to the value of exponent e. In the RSA case, all calculations are performed modulo n. Value n is thus also known or received by the cell for executing the exponentiation.

To simplify the discussion of the present invention, an exponentiation calculation will, for example, be taken with notations $M^e$ mod n, knowing that number M, exponent e, and modulo n may form all or part of any number (for example, M'), exponent (for example, d), and modulo, in relation or not with the RSA algorithm.

The square-and-multiply technique takes advantage of the binary expression of the exponent in a calculation by electronic or computer means. Variable e' will be considered hereafter as a succession of bits initially representing exponent e of the calculation.

The square-and-multiply technique is performed by iterations on variables T and R, the number of iterations being equal to the number of (significant) bits of exponent e.

Before each iteration, the current value of variable e' is tested (block 22, e'=0?) to determine whether it still contains significant bits (at least another bit at 1). If variable e' is zero (output Y of test 22), result variable R provides result $M^e$ of the exponentiation. Otherwise (output N of block 22), the calculation enters a loop.

At each iteration of this loop, the even or odd character of the current value of variable e' is tested (block 23, Is e' ODD ?). If e' is odd (output Y of test 23), the content of variable R is multiplied by the content of variable T and the result becomes the current value of variable R (block 24, R=R*T). Otherwise (output N of block 23), variable R is not modified.

The content of variable e' is then shifted rightwards (block 25, Right SHIFT e'), which amounts to eliminating the least significant bit which has conditioned the even or odd character in the preceding test 23. In the example of a binary representation of the exponent, this amounts to dividing variable e' by 2 (in integer part). According to the hardware elements used to execute the algorithm, the step of rightward shifting of variable e' may be carried out by a shift register or be replaced with the successive taking into account of the different bits of exponent e.

The content of variable T is then squared (block 27, T=T*T), which amounts to performing another multiplication and the result becomes the current value of variable T. The iteration is over. The calculation then resumes with test 22 to restart an iteration if there remain unprocessed significant bits of the exponent.

Optionally, the current value (comprising one less representative bit) of variable e' is tested (block 26, e'=0 ? in dotted lines) prior to step 27 to check whether there remain significant bits. If so (output N of test 26), calculation 27 is performed. Otherwise (output Y of block 26), variable T is not modified. This option enables saving a calculation at the end of the algorithm.

A disadvantage of an exponentiation calculation such as described in relation with FIG. 4 is that it is vulnerable to attacks tending to discover the handled secret quantities.

A first type of attack is to monitor the calculation execution time which differs, at each iteration, according to the even or odd character of current exponent e'. Now, this even or odd character directly provides value 0 or 1 of the corresponding least significant bit.

A known solution to solve this execution time problem is to introduce (block 28, D=R*T), in case of a negative test 23 (least significant bit of variable e' equal to 0), an arbitrary calculation that is not needed for the result.

Such an unnecessary calculation is not necessary to compensate for calculation 27 in the presence of test 26, since the only iteration in which calculation 27 is not executed is the last one.

Even if it can be provided for the calculation to take the same time whatever the iteration, this calculation remains vulnerable to another category of attacks, called fault injection attacks. A fault injection attack comprises causing a disturbance in the integrated circuit operation in the calculation execution (for example, by means of a laser, of a disturbance on the power supply, etc.) and interpreting the subsequent circuit operation to attempt discovering the secret quantities (here exponent e).

In the case of a square-and-multiply calculation, by disturbing the multiplication operation (block 24 or block 28) in an iteration of the algorithm, a hacker is able to determine whether the least significant bit of the current value of the exponent (e') is 0 or 1. Indeed, if it is a 0, the final result provided by the calculation will be the same as with no disturbance, since the disturbance bears on the multiplication of block 28 while, if the bit is at 1, the final result will be modified since the disturbance bears on the multiplication of block 24. By repeating the fault injections at different times in successive executions of the same calculation, it is then possible for the hacker to deduce all or part of the key (the exponent), and thus, at least, to decrease the number of assumptions to be made about this key.

FIG. 5 very schematically illustrates in the form of blocks another example of application of the present invention to a Diffie-Hellman algorithm on an elliptic curve.

Such an algorithm is used to create a shared key K (for example, a session key) for a protected exchange between two systems or circuits P1 and P2. Each circuit holds a private key, respectively a or b, and an element G of an elliptic curve defining, with an internal composition law arbitrarily called "addition", noted "(+)", an abelian group on which the calculation is performed. Element G is known and needs no protection. Private keys a and b are integers expressing the number of times that the group composition law is applied.

A property of an elliptic curve thus is that, starting from a point in the curve, the application, an integral number of times, of the composition law called addition provides a result still located on the curve. Sometimes, it is spoken of as a "product", noted "·", to designate the number of times that the composition law is applied.

Elliptic curves are used in cryptography for the asymmetrical character of the iterative calculation, that is, knowing a point in the curve, it is easy to obtain another point in the curve by applying the composition law an integral number of times but, knowing two points in the curve, it is difficult to find the integer (the key) connecting these two points.

Examples of application of elliptic curves to cryptography are described in standards: "Standards for Efficient cryptography, sec 1: Elliptic Curve Cryptography"—Certicom Research—Sep. 20, 2000, Version 1.0c; "DSA on Elliptic Curves: ECDSA"—ISO/IEC 15946-2; and "Diffie-Hellman on Elliptic Curves: ECDH"—ISO/IEC 15946-3, which references are incorporated herein by reference.

Each circuit P1, P2 calculates a public key, respectively A, B as being the result of the "product" of its private key a or b with element G (block 163, A=a.G and block 165, B=b.G). Then, each circuit sends its public key to the other. Finally, each circuit P1, P2 calculates a key K as being the "product" of its private key a or b by the public key, respectively B or A, of the other circuit (block 164, K=a.B, block 166, K=b.A). Due to the properties of the internal composition law of the group, keys K are identical (K=a.b.G=b.a.G). Key K can thus be used as a secret key shared by the two circuits. It can then be used as a ciphering (for example, by a symmetrical algorithm), authentication, etc. key between circuits P1 and P2.

As for an exponentiation, due to the size of the handled numbers, the successive applications of the internal composition law from a point of an elliptic curve are calculated by a so-called add-and-double technique which exploits the binary (polynomial) representation of the integer (a or b) to break up the calculation into a succession of doublings (application of the composition law to a point on itself) and additions (application of the composition law to a preceding intermediary result).

FIG. 6 is a flowchart illustrating the add-and-double technique, for example, applied to a point G of an elliptic curve. As for FIG. 4, the calculation shown as a flowchart in FIG. 6 is in practice generally performed by a hardware cell (in wire logic) but may also be implemented in software fashion.

The add-and-double technique exploits the same characteristic of the binary expression of the integer as that exploited for the exponent in the modular exponentiation. Indeed, product a.G can be written as $G(+)G(+) \ldots (+)G$ (a times). Representing a in binary fashion over t bits, this product can also be written as $a_t 2^t G(+) a_{t-1} 2^{t-1} G(+) (+) a_1 2^1 G(+) a_0 2^0 G$, where coefficient $a_i$ of the term of degree i (i ranging between 0 and t) corresponds to the bit (value 0 or 1) of weight i of the binary expression of number a.

The add-and-double calculation is then performed by iterations on variables T and R, respectively representing a temporary variable and the result variable, the number of iterations being equal to number t of (significant) bits of number a. The calculation of FIG. 6 is identical to that of FIG. 4, by:

initializing (block 21', R=0; T=G; a'=a) variables R, T, and a', respectively with values 0 designating the neutral element of the internal composition law (here, the addition) on the group (here, the elliptic curve), G designating the group element (here, a point of the elliptic curve) and a in the form of a sequence of coefficients of a polynomial (here, a bit sequence), the significant degree of which designates the number of iterations;

replacing the multiplications * of blocks 24 and 27 (and, if existing, that of block 28) with the (+) composition law (block 24', R=R(+)T, block 27', T=T(+)T and block 28', D=R(+)T); and applying steps 22, 23, and 25 to variable a'.

The algorithm of FIG. 6 exhibits the same disadvantages of vulnerability to attacks, especially by fault injections, as the square-and-multiply algorithm.

More generally, similar problems may be posed for any calculation, by an electronic circuit, of an integral number of applications of an internal composition law on elements of an abelian group, by successive iterations of different steps according to the even or odd character of a current coefficient of a polynomial representation of said integer, the degree of which determines the number of iterations.

In the case of the exponentiation, the exponent is the integer and the composition law or internal operation of the abelian group is multiplication.

Another problem is the detection of a possible disturbance in the circuit operation. Indeed, if the circuit is able to detect this disturbance, it can then take appropriate measures such as blocking the smart card or providing a purposefully erroneous result.

SUMMARY OF THE INVENTION

The present invention aims at overcoming all or part of the disadvantages of known algorithms of calculation by successive iterations on a group executed by an electronic circuit.

The present invention more specifically aims at the detection of a voluntary or incidental disturbance in the execution of the calculation.

The present invention also aims at preventing exploitation of possible attacks, especially by injection of faults into the electronic circuit executing the calculation.

The present invention also aims at a solution which does not adversely affect the rapidity of execution of the calculations.

According to an object, the present invention more specifically aims at exponentiations of an element of a group by the square-and-multiply method.

According to another object, the present invention more specifically aims at calculations by application of the add-and-double method.

To achieve all or part of these objects, as well as others, the present invention provides a method for detecting a disturbance of a calculation, by an electronic circuit, of a result of an integral number of applications of an internal composition law on elements of an abelian group, by successive iterations of different steps according to the even or odd character of a current coefficient of a polynomial representation of said integral number, the degree of which determines the number of iterations, each iteration comprising:

in case of an odd current coefficient, step of updating at least one first variable intended to contain the result at the end of the calculation; and in case of an even current coefficient, at least a step of updating a second variable and a step of comparison of this second variable with an expected value.

According to an embodiment of the present invention, a lack of identity between the second variable and said expected value results in a stopping of the calculation.

According to an embodiment of the present invention, in case there is no identity between the second variable and said expected value, the first variable is updated by a function modifying its value, before proceeding to the rest of the calculation.

According to an embodiment of the present invention, if said comparison step results in an identity between the second variable and the expected value, the second variable is updated by the application of said function to said first variable.

According to an embodiment of the present invention, the method executes, as long as all the significant coefficients of the polynomial representation of the integer have not been processed, at least the following operations:

if the current coefficient is even: D=A(+)B, otherwise R=R(+)T and D=f(R); and in all cases: T=T(+)T, where (+) designates said composition law, R is said first variable initialized with the neutral element of the composition law to contain the final result, T is a third variable initialized with the value of the element to be submitted to the calculation, f is a function modifying its operand, and D is said second variable.

According to an embodiment of the present invention, said expected value is the result of an application of said composition law to two elements of the group, said step of updating the second variable includes submitting these two elements to said composition law.

According to an embodiment of the present invention, in case of an odd current coefficient, an unnecessary comparison of the second variable is performed after updating of the first variable.

According to an embodiment of the present invention, said integer is represented in binary form.

According to an embodiment of the present invention, the method is applied to the calculation of an exponentiation, in which:

said element is a number;
said internal composition law is a multiplication operation; and
said integer is the exponent.

The present invention also provides a ciphering or deciphering method according to the RSA algorithm.

According to an embodiment of the present invention, said element is a point of an elliptic curve.

According to an embodiment of the present invention, the variables are contained in registers of the electronic circuit.

The present invention also provides a calculation cell.

The present invention also provides an integrated circuit comprising a calculation cell.

The foregoing and other objects, features, and advantages of the present invention will be discussed in detail in the following non-limiting description of specific embodiments in connection with the accompanying drawings.

DETAILED DESCRIPTION

Figure 1:
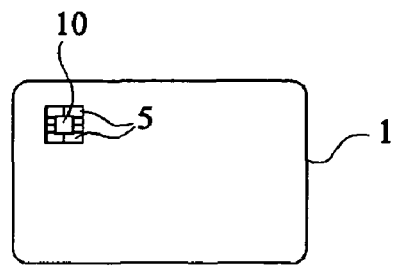
FIG. 1, previously described, very schematically shows an example of a smart card of the type to which the present invention applies as an example.
Figure 2:
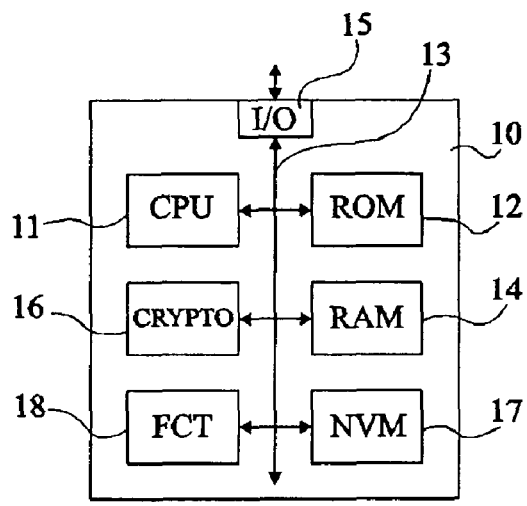
FIG. 2, previously described, is a schematic block diagram of a conventional example of a microcontroller provided with a hardware cryptographic calculation cell of the type to which the present invention applies as an example.
Figure 3:
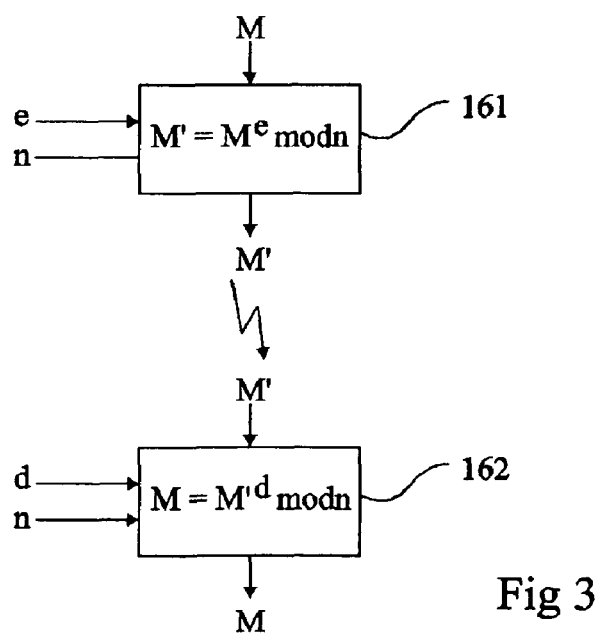
FIG. 3, previously described, is a schematic block diagram illustrating the execution of a ciphering/deciphering by an RSA algorithm to which the present invention applies as an example.

The same elements have been designated with the same reference numerals in the different drawings. For clarity, only those steps and elements which are useful to the understanding of the present invention have been shown in the drawings and will be described hereafter. In particular, the hardware elements (registers, operators, etc.) used to implement the present invention by means of an integrated circuit have not been described in detail, the present invention being compatible with the elements used to implement conventional algorithms.

The present invention will be described hereafter in relation with two examples of application, respectively: to an exponentiation calculation by the square-and-multiply method and to an iterative calculation by the add-and-double method. It should, however, be noted that it more generally applies to any calculation (arbitrarily designated as "."), by an electronic circuit, of a result of an integral number of applications of an internal composition law (arbitrarily designated as (+)) on elements of a group, provided that the calculation breaks up into several iterations of steps applying the composition law on variables representing elements of the group and that the steps are different according to the even or odd character of a current coefficient of a polynomial representation of the integer, the significant degree of which determines the number of iterations.

Figure 7:
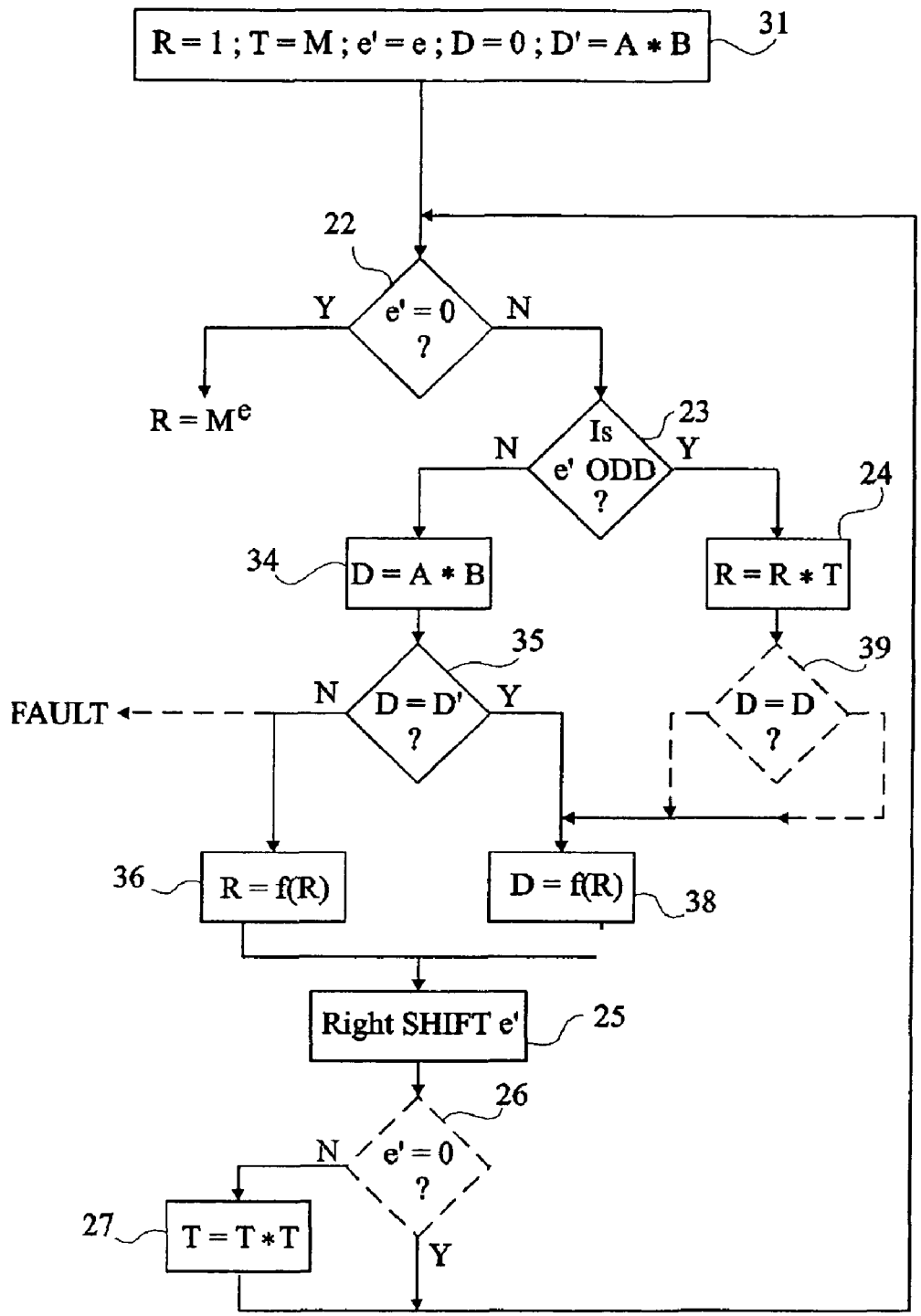
FIG. 7 is an algorithm very schematically illustrating in the form of blocks an embodiment of the present invention applied to an exponentiation calculation.

FIG. 7 is a flowchart illustrating an embodiment of the present invention, applied to an exponentiation calculation, enabling detection of a possible fault injection attack along its operation.

As previously, a first step (block 31, R=1; T=M; e'=e; D=0; D'=A*B) comprises the initialization of a result variable R to unity (neutral element of the composition law—here, the multiplication—of the group), of a temporary variable T with value M (group element) to be submitted to the exponentiation, and of an exponent variable e' with the coefficients of a polynomial (binary) representation of exponent e (integral number of times that the multiplication should be applied). In the case of a modular exponentiation, all the calculations which will be described are performed modulo n, the value of which is then known or received by the algorithm execution cell.

According to this embodiment of the present invention, initialization step 31 further comprises the initialization of a variable D to any value (for example, 0) and of a variable D' corresponding to the result of the multiplication of two arbitrarily-selected numbers A and B, for example, randomly selected at each iteration. In the case of a modular exponentiation, numbers A and B are preferentially selected to be of the same size as that of the value (n) of the modulo. As a variation, variable D is not initialized.

Figure 4:
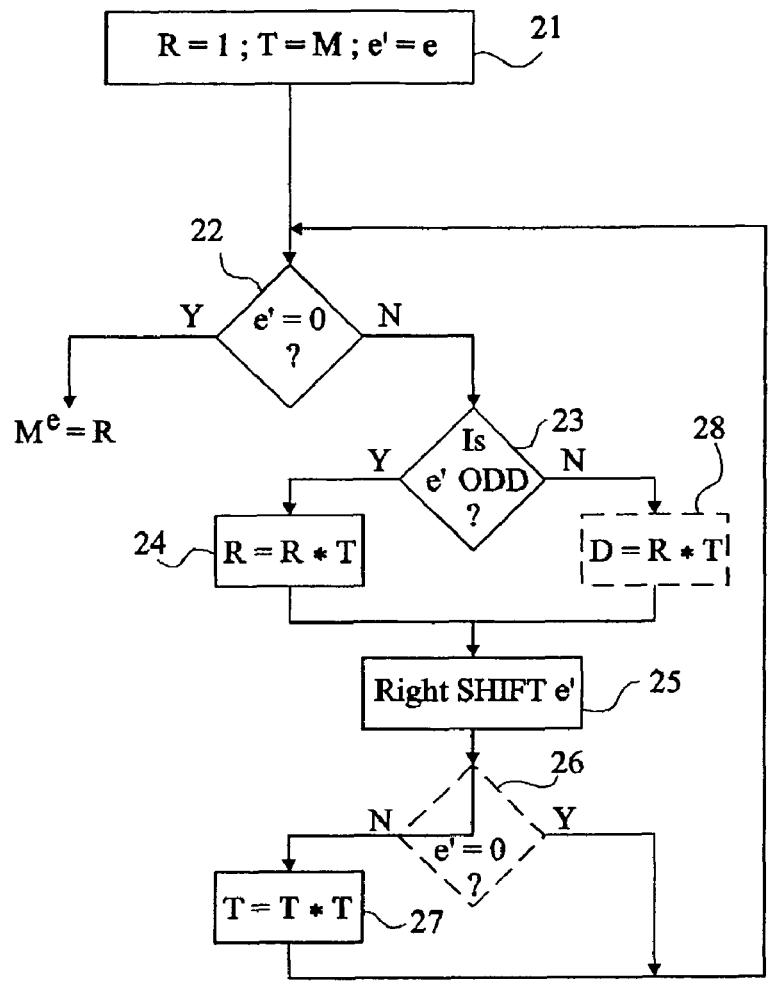
FIG. 4, previously described, is a flowchart of a conventional example of an exponentiation calculation by the square-and-multiply method.

The calculation is performed, as in the conventional case of FIG. 4, by iterations at least on variables T and R. The current value of variable e' is, before each iteration, tested (block 22, e'=0 ?) to determine whether it still contains significant bits (coefficients of the polynomial expression of the integer). If not (output Y of block 22), variable R contains result Me of the exponentiation. Otherwise, the even or odd character of variable e' (block 23, Is e' ODD ?) or value 0 or 1 of its least significant bit are tested. If e' is odd (least significant bit at 1), the content of variable R is multiplied (composition law or operation of the group) by the content of variable T (block 24, R=R*T).

In the case (output N of block 23) where the current bit of the exponent is 0 (even variable e'), variable D is updated by the result of the multiplication of quantities A and B (block 34, D=A*B). Values A and B may be any values but are predefined so that the content of variable D after step 34 can be compared with the content of variable D'. As a variation, variable D is directly updated with an expected value. However, an advantage of performing a multiplication at step 34 is that this preserves an execution time independent from the state of the current bit of the exponent. The comparison is performed at a next step (block 35, D=D' ?) which is the step of detection of a possible disturbance in the algorithm. In the case where variables D and D' are different from each other, this means that a disturbance has occurred since the last test (previous iteration).

According to a first embodiment, this detection results in an immediate action (FAULT). It may be any action usually taken in such circuits in case a disturbance attempt is detected, for example, a blocking of the smart card, an incrementation of a faulty event counter, etc.

Figure 5:
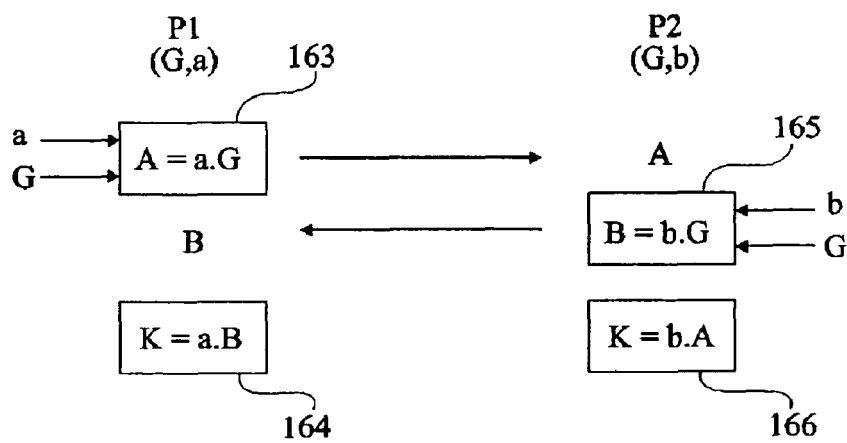
FIG. 5, previously described, is a schematic block diagram illustrating the execution of a Diffie-Hellman protocol on an elliptic curve to which the present invention applies as an example.
Figure 6:
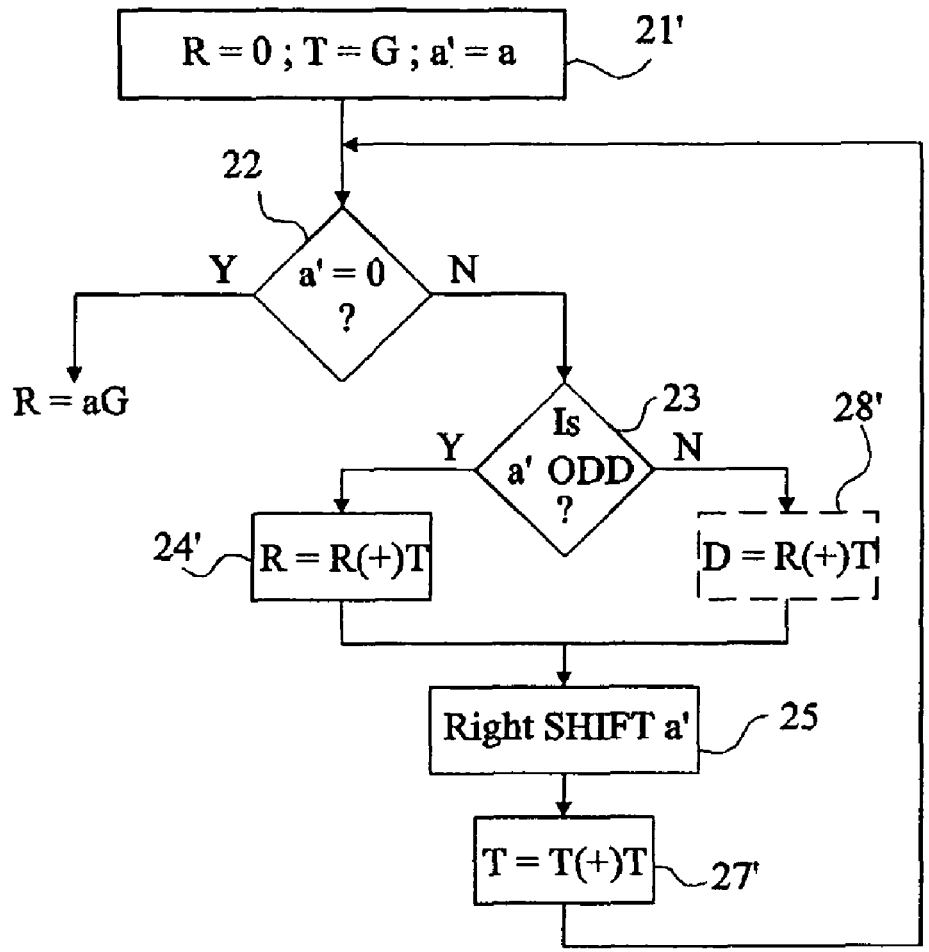
FIG. 6, previously described, is a flowchart of a conventional example of calculation by the add-and-double method.

According to the preferred embodiment illustrated in FIG. 5, test 35 results in a modification of the calculation. If variables D and D' are identical (output Y of test 35), the content of variable D is replaced with the result of the application of a function f to variable R (block 38, D=f(R)). In the opposite case (output N of test 35), the content of result variable R is replaced (block 36, R=f(R)) with value f(R). This results, in case a disturbance is detected, in altering the subsequent result calculated by the algorithm.

Preferably, to mask the execution time and the consumption, once variable R has been updated at block 24, variable D is updated with the result of function f applied to variable R (block 38, D=f(R)) and a test (block 39, D=D?), the result of which is needless (or having its two exits leading to step 38) is interposed between steps 24 and 38. As a variation, test 39 may be replaced with a test identical to test 35, provided to perform step 38 whatever the result of the test.

Function f may be any function, provided that it modifies the entrance variable. A random shifting or inversion of the bits of variable R, for example, but more generally any function such that result D is different from R, may be selected.

Then, the bits of the current value of variable e' are shifted (block 25, Right SHIFT e') rightwards to eliminate the least significant bit (coefficient of the term of minimum degree of the polynomial expression of number e). The content of variable T is then multiplied by itself (block 27, T=T*T). The iteration is then over (return to the entrance of block 22).

As previously, a test (block 26, e'=0? in dotted lines) may optionally be provided on variable e' before step 27 to avoid this step at the last iteration (output Y of block 26).

Figure 8:
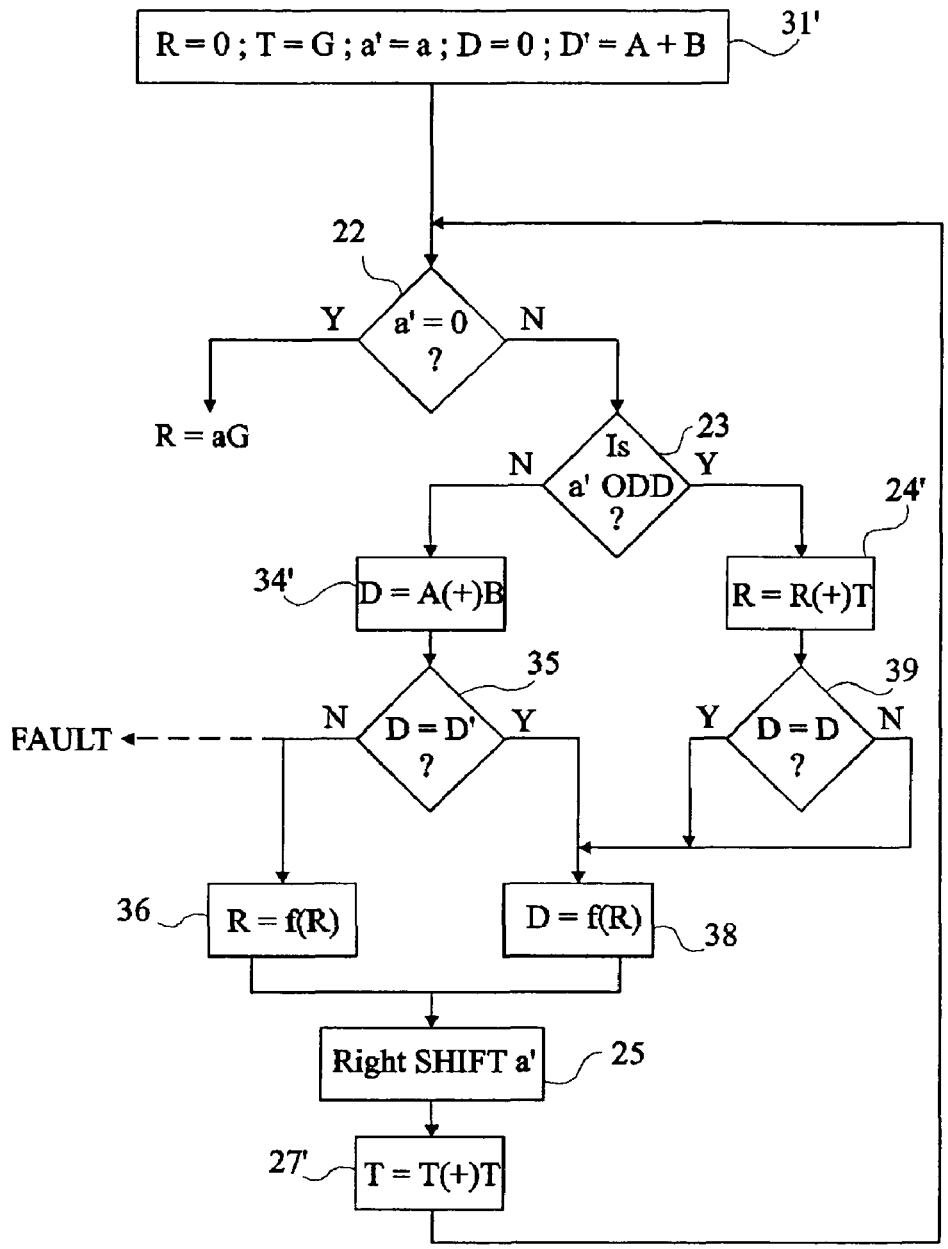
FIG. 8 is a flowchart illustrating the embodiment of FIG. 7 applied to an add-and-double calculation.

FIG. 8 is a flowchart illustrating the application of the first embodiment of the present invention to a calculation on an elliptic curve, by using an add-and-double method.

The calculation of FIG. 8 is similar to that of FIG. 7, by:

initializing (block 31', R=0; T=G; a'=a; D=0; D'=A*B) variables R, T, a', D, and D' respectively with values 0 designating the neutral element of the composition law (here called addition (+)) on the group (here, the elliptic curve), G designating the group element (here, the point of the elliptic curve), a sequence of coefficients (here a bit sequence) of a polynomial representation of an integer a designating the number of times that the composition law should be applied, any value (for example, 0) and a value representing the application of the composition law to any two values A and B;

replacing the multiplications of blocks 24, 27, and 34 with "additions" (block 24', R=R(+)T, block 27', T=T(+)T and block 34', D=A(+)B); and applying steps 22, 23, and 25 to variable a'.

As for the embodiment of FIG. 7, the initialization of variables D and D' is optional since these variables are modified as soon as they intervene in the calculation. In FIG. 8, test 26 has been eliminated.

An advantage of the present invention is that it enables detecting a possible disturbance within the very algorithm, as soon as such a disturbance occurs without for the hacker to have had time to exploit the results.

Another advantage is, especially in the case where the circuit operation is not immediately interrupted, that the provided result may be altered without for all this for a possible hacker to notice that the disturbance has been detected.

According to an alternative embodiment, step 36 is replaced with an updating of variable T with result f(T). This also disturbs the result of the calculation by acting on variable T.

According to another variation, variables A and B are arbitrarily-selected values (for example, selected on manufacturing, programming, or customization of the electronic circuit) stored in non-volatile fashion.

Of course, the present invention is likely to have various alterations, improvements, and modifications which will readily occur to those skilled in the art. In particular, the present invention applies whatever the size of the handled numbers.

Further, the practical implementation of the present invention based on the functional indications given hereabove is within the abilities of those skilled in the art by using available hardware and/or software tools. In particular, a hardware implementation based on registers or other storage circuits, various operators, bit state comparators, etc. may use available elements.

Moreover, the transposition of the embodiments of the present invention to other composition laws on other groups is within the abilities of those skilled in the art.

Such alterations, modifications and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of detection of a disturbance of a calculation, by an electronic circuit, of a result of an integral number of applications of an internal composition law on elements of an abelian group, by successive iterations of different steps according to the even or odd character of a current coefficient of a polynomial representation of said integral number, the degree of which determines the number of iterations, each iteration comprising:

initializing an expected value to a result of application of said composition law to first and second arbitrarily-selected numbers;

in case of an odd current coefficient, updating at least one first variable intended to contain the result at the end of the calculation; and in case of an even current coefficient, updating a second variable by application of said composition law to the first and second arbitrarily-selected numbers and comparing the updated second variable with the expected value, the value of the updated second variable having no effect on the result of the calculation, wherein a lack of identity between the updated second variable and the expected value indicates a disturbance of the calculation, wherein in case there is no identity between the second variable and said expected value, the first variable is updated by a function modifying its value, before proceeding to the rest of the calculation, including executing, as long as all the significant coefficients of the polynomial representation of the integer have not been processed, at least the following operations:

if the current coefficient is even: D=A(+)B, otherwise R=R(+)T and D=f(R); and in all cases: T=T(+)T, where (+) designates said composition law, R is said first variable initialized with the neutral element of the composition law to contain the final result, T is a third variable initialized with the value of the element to be submitted to the calculation, f is a function modifying its operand, and D is said second variable, A and B being digital values.

2. The method of claim 1, wherein if said comparison step results in identity between the updated second variable and the expected value, the second variable is updated by the application of said function to said first variable.

3. The method of claim 1, wherein in case of an odd current coefficient, an unnecessary comparison of the second variable is performed after updating of the first variable.

4. The method of claim 1, applied to the calculation of an exponentiation, wherein:

said element is a number;

said internal composition law is a multiplication operation; and said integral number is the exponent.

5. A ciphering or deciphering method according to the RSA algorithm, implementing at least one calculation of claim 4.

6. The method of claim 1, wherein said element is a point of an elliptic curve.

7. The method of claim 1, wherein the variables are contained in registers of the electronic circuit.

8. A calculation cell configured to implement the method of claim 1.

9. An integrated circuit comprising the calculation cell of claim 8.

10. A method for detecting a disturbance of a calculation, by an electronic circuit, of a result of an integral number of applications of an internal composition law to elements of an abelian group, comprising:
- initializing an expected value to a result of application of said composition law to first and second arbitrarily-selected numbers;
- performing iterations of the calculation with different operations based on an even or odd current coefficient of a polynomial representation of said integral number, the degree of which determines the number of iterations;
- for each iteration having an odd current coefficient, updating at least one first variable that contains, after all iterations, a result of the calculation; and
- for each iteration having an even current coefficient, updating a second variable by application of said composition law to the first and second arbitrarily-selected numbers and comparing the updated second variable with the expected value, the updated second variable having no effect on the result of the calculation, wherein a lack of identity between the second variable and the expected value indicates a disturbance of the calculation, wherein in case there is no identity between the second variable and said expected value, the first variable is updated by a function modifying its value, before proceeding to the rest of the calculation, including executing, as long as all the significant coefficients of the polynomial representation of the integer have not been processed, at least the following operations:
- if the current coefficient is even: D=A(+)B, otherwise R=R(+)T and D=f(R); and
- in all cases: T=T(+)T,
- where (+) designates said composition law, R is said first variable initialized with the neutral element of the composition law to contain the final result, T is a third variable initialized with the value of the element to be submitted to the calculation, f is a function modifying its operand, and D is said second variable, A and B being digital values.

11. The method of claim 10, wherein identity between the updated second variable and the expected value causes the second variable to be updated by application of the function to the first variable.

12. The method of claim 10, wherein, for each iteration having an odd current coefficient, an unnecessary comparison of the second variable is performed after updating of the first variable.

13. A method of detection of a disturbance of a calculation, by an electronic circuit, of a result of an integral number of applications of an internal composition law on elements of an abelian group, by successive iterations of different steps according to the even or odd character of a current coefficient of a polynomial representation of said integral number, the degree of which determines the number of iterations, each iteration comprising:
- in case of an odd current coefficient, updating at least one first variable intended to contain the result at the end of the calculation; and
- in case of an even current coefficient, updating a second variable and a step of comparison of this second variable with an expected value, the value of the second variable having no incidence on the result of the calculation, wherein in case there is no identity between the second variable and said expected value, the first variable is updated by a function modifying its value, before proceeding to the rest of the calculation, including executing, as long as all the significant coefficients of the polynomial representation of the integer have not been processed, at least the following operations:
- if the current coefficient is even: D=A(+)B, otherwise R=R(+)T and D=f(R); and
- in all cases: T=T(+)T,
- where (+) designates said composition law, R is said first variable initialized with the neutral element of the composition law to contain the final result, T is a third variable initialized with the value of the element to be submitted to the calculation, f is a function modifying its operand, and D is said second variable, A and B being digital values.

14. The method of claim 1, wherein the first and second arbitrarily-selected numbers are randomly selected.

15. The method of claim 10, wherein the first and second arbitrarily-selected numbers are randomly selected.

* * * * *